US005716580A

United States Patent [19]
Wagner et al.

[11] Patent Number: 5,716,580
[45] Date of Patent: Feb. 10, 1998

[54] PROCESS FOR PRODUCING MOLDINGS USING A MOLD RELEASE AGENT

[75] Inventors: Joachim Wagner; Werner Rasshofer, both of Köln, Germany

[73] Assignee: Bayer Aktiengesellschaft, Leverkusen, Germany

[21] Appl. No.: 596,970

[22] Filed: Feb. 5, 1996

[30] Foreign Application Priority Data

Feb. 9, 1995 [DE] Germany .................. 195 04 263.8

[51] Int. Cl.⁶ ........................................................ B28B 7/36
[52] U.S. Cl. ........................ 264/331.19; 264/51; 264/338
[58] Field of Search ................................ 264/338, 51, 53, 264/331.19

[56] References Cited

U.S. PATENT DOCUMENTS

| 3,127,457 | 3/1964 | Pinto | 264/338 |
| 3,624,190 | 11/1971 | Cekada, Jr. | 264/338 |
| 4,054,592 | 10/1977 | Dear et al. | 560/25 |
| 4,130,698 | 12/1978 | Sparrow et al. | 264/338 |
| 4,312,672 | 1/1982 | Blahak et al. | 264/338 |
| 4,487,912 | 12/1984 | Zimmerman et al. | 528/52 |
| 4,774,263 | 9/1988 | Weber et al. | 521/51 |
| 4,774,264 | 9/1988 | Weber et al. | 521/51 |
| 5,036,151 | 7/1991 | Ohst et al. | 524/101 |

FOREIGN PATENT DOCUMENTS

| 002004 | 5/1979 | European Pat. Off. |  |
| 335619 | 10/1989 | European Pat. Off. |  |
| 2702930 | 7/1978 | Germany | 264/338 |
| 51-84859 | 7/1976 | Japan | 264/338 |
| 52-51472 | 4/1977 | Japan | 264/338 |
| 60-168613 | 9/1985 | Japan . |  |
| WO8404275 | 11/1984 | WIPO | 264/338 |

*Primary Examiner*—Allan R. Kuhns
*Attorney, Agent, or Firm*—Joseph C. Gil; Noland J. Cheung

[57] ABSTRACT

The present invention is directed to a process for the production of moldings from plastic forming materials in metal molds comprising coating at least a portion of the internal walls of the mold with an external mold release agent, introducing the plastic forming material into the mold, closing the mold, and removing the product from the mold, the improvement wherein the external mold release agent comprises one or more organic compounds the molecules of contain on a statistical average A) from 0.5 to 1.2 polar groups selected from the group consisting of —CN, —NC, —NCO, —CNO, —OCN, —SCN and —NCS and B) at least one non-polar hydrocarbon chain with at least 12 carbon atoms, which chain may be at least partially fluorinated, and which may be interrupted by heteroatoms and/or carbonyl groups.

5 Claims, No Drawings 5,716,580

PROCESS FOR PRODUCING MOLDINGS USING A MOLD RELEASE AGENT

BACKGROUND OF THE INVENTION

The present invention relates to a process for the production of plastic moldings, and in particular moldings made from polyurethanes. The polyurethanes may be foamed plastics and they may have urea and/or isocyanurate groups. The moldings are prepared in closed metal molds, the internal walls of which are at least partially coated with the mold release agent of the present invention. The invention is also directed to the mold release agent.

When producing plastic moldings, and in particular when producing molded parts from reaction mixtures which yield polyurethanes which may be foamed and may contain urea and/or isocyanurate groups, in closed metal molds, so-called external mold release agents are generally applied to at least a portion of the internal walls of the metal mold, prior to introducing the plastic (or reaction mixture) into the mold. The release agent is intended to prevent adhesive contact between the reacting mixture and the metal of the metal mold. Known external mold release agents are generally compounds such as fats, soaps, waxes, silicones and other lipophilic compounds (c.f. Becker/Braun, Kunststoffhandbuch, volume 7, *Polyurethane*, Carl Hanser Verlag, Munich/Vienna (1983)). Known external mold release agents contain no groups which may interact in an adhesive manner with the metal surfaces. This is understandable, as the prevailing opinion is to provide the least possible adhesion to the metal surface.

Known external mold release agents suffer the disadvantage that they generally do not adhere to the internal metal surfaces of the mold and often have a greater affinity for the plastic and than for the metal. As a consequence, the internal mold release coating of the metal mold tool survives only a few reaction cycles and is rinsed off by the liquid plastic or liquid reaction mixture yielding the plastic after only a small number of reaction cycles and must be replaced.

The object underlying the invention was thus to provide a novel mold release agent which is at least equal to known prior art mold release agents with regard to its release action, but which adheres sufficiently strongly to the metallic internal surfaces of the mold in order to prevent the liquid plastic or liquid reaction mixture yielding the plastic from "rinsing off" the internal coating of the mold. Such a mold release agent would then survive substantially more reaction cycles and would have to be replaced much less frequently than the stated prior art mold release agents.

DESCRIPTION OF THE INVENTION

The above object could be achieved through the use of the mold release agents described herein and through the process for the production of plastic moldings described herein.

The present invention is therefore directed to a process for the production of moldings from plastic forming materials in metal molds comprising coating at least a portion of the internal walls of the mold with an external mold release agent, introducing the plastic forming material into the mold, closing the mold, and removing the product from the mold, the improvement wherein said external mold release agent comprises one or more organic compounds the molecules of contain on a statistical average A) from 0.5 to 1.2 polar groups selected from the group consisting of —CN, —NC, —NCO, —CNO, —OCN, —SCN and —NCS and B) at least one non-polar hydrocarbon chain with at least 12 carbon atoms, which chain may be at least partially fluorinated, and which may be interrupted by heteroatoms and/or carbonyl groups.

The present invention also is directed to an external mold release for coating the internal surfaces of metal molds consisting of a 0.1 to 100 wt. % solution of an organic compound or mixture of organic compounds in a solvent which is inert towards isocyanate groups, wherein the organic compound or mixture of organic compounds has on a statistical average A) from 0.5 to 1.2 isocyanate groups and B) at least one non-polar hydrocarbon chain with at least 12 carbon atoms, which chain may be at least partially fluorinated, and which may be interrupted by heteroatoms and/or carbonyl groups.

The mold release agents according to the invention are organic
compounds or mixtures of organic compounds, each molecule of which contains on a statistical average A) from 0.5 to 1.2, preferably 0.9 to 11, and preferably one polar, metallophilic group of the above-stated type, preferably an isocyanate group and B) at least one non-polar, lipophilic group.

The non-polar groups B) are hydrocarbon residues with at least 12, preferably at least up to 14 and in particular 16 to 32 carbon atoms, which may be at least partially fluorinated, and which may be interrupted by heteroatoms and/or carbonyl groups. Preferred residues are alkyl (which may be unsaturated), aralkyl, alkaryl or aryl groups corresponding to this definition. The heteroatoms which optionally interrupt the hydrocarbon residues are, for example, ether oxygen or oxygen or nitrogen atoms, as are present in urethane, urea, allophanate, isocyanurate or uretidione groups. The release agents according to the invention having heteroatoms or carbonyl groups in the chain are produced when alcohols optionally containing ether groups are reacted with optionally modified polyisocyanates of the type stated by way of example below to produce the release agents. The statements made relating to the number of carbon atoms in the hydrocarbon residues do not include carbon atoms which are attached via a double bond to oxygen. Pursuant to this definition, the monoisocyanate prepared from n-dodecanol and hexamethylene diisocyanate in a 1:1 molar ratio suitable as a mold release agent according to the invention has a hydrocarbon residue "interrupted by heteroatoms and a carbonyl group" with 18 carbon atoms.

Suitable mold release agents according to the invention are, for example, n-dodecyl isocyanate, isononylphenyl isocyanates and in particular reaction products containing urethane or urea groups prepared from organic polyisocyanates with optionally at least partially fluorinated fatty alcohols and/or fatty amines with at least 12, preferably at least 14 carbon atoms, wherein the quantity ratios of the starting components in this reaction are selected in such a manner that the reaction products comply with the above-stated conditions with regard to their average NCO functionality. Monohydric, hydrophobic polyether alcohols, as may for example be obtained by reacting monovalent starter molecules with propylene oxide or with tetrahydrofuran, may also be used as reaction partners for the organic polyisocyanates. Mold release agents according to the invention with ether groups are produced in this manner.

Polyisocyanates suitable for producing the stated reaction products are in particular those of the molecular weight range from 168 to 300, and in particular diisocyanates with aromatically and/or (cyclo)aliphatically attached isocyanate groups, such as for example 2,4-diisocyanatotoluene and the commercial mixtures thereof with 2,6-diisocyanatotoluene; 4,4'-diisocyanatodicyclomethane and the commercial mixtures thereof with 2,4'-diisocyanatodicyclomethane; 1,6-diisocyanatohexane; 1,12-diisocyanatododecane; 1,3-diisocyanatocyclo-butane; 1,3- and 1,4-diisocyanatocyclohexane and desired mixtures of these isomers; 1-isocyanato-3,3,5-trimethyl-5-isocyanatomethylcyclohexane (IPDI); 2,4- and/or 4,4'diisocyanatodicyclohexyl-methane; and mixtures of such diisocyanates. Further suitable compounds are polyisocyanates modified with urethane, allophanate, isocyanurate, urea, biuret and/or uretidione groups based on (cyclo)aliphatic diisocyanates or mixtures thereof. Mixtures of unmodified diisocyanates with modified polyisocyanates may also be used to produce the stated reaction products.

It is, in principle, also possible to use those internal mold release agents which contain, instead of isocyanate groups, other metallophilic groups of the type stated above and which otherwise fulfil the conditions stated herein.

The process according to the invention is suitable for the production of any desired plastic moldings, during the production of which closed metal molds are used, which are at least partially coated with an internal mold release agent in order to improve demoldability of the plastics. This means that the process according to the invention is, for example, suitable for the production of plastic moldings based on any, per se known, previously produced thermoplastics which may be shaped in metal molds.

Preferably, however, the process according to the invention is suitable for the production of optionally foamed moldings based on polyurethane plastics optionally containing urea groups and/or optionally containing isocyanurate groups by reacting an appropriate, optionally foamable, reaction mixture which reacts to yield such a plastic in closed metal molds. These per se known polyisocyanate polyaddition products are produced in a manner known per se from starting components of the type described below in a) to d) and optionally also using the auxiliary substances and additives described below in e).

Both aromatic and (cyclo)aliphatic polyisocyanates are suitable as the polyisocyanate component a). Aromatic polyisocyanates are, however, preferred. Suitable aromatic polyisocyanates a) are in particular the compounds described in European patent 081,701, column 3, line 30 to column 4, line 25, wherein the polyisocyanates which the optionally chemically modified polyisocyanates or polyisocyanate mixtures of the diphenylmethane series are preferred for the purposes of the present invention.

Suitable (cyclo)aliphatic polyisocyanates a) are any desired organic diisocyanates of a molecular weight of above 137, preferably of 168 to 300 with exclusively (cyclo) aliphatically attached isocyanate groups, such as for example 1,6-diisocyanatohexane; 1,12-diisocyanatododecane; 1,3-diisocyanatocyclobutane; 1,3- and 1,4-diisocyanatocyclohexane and mixtures of these isomers; 1-isocyanato-3,3,5-trimethyl-5isocyanatomethylcyclohexane (IPDI); 2,4- and/or 4,4'-diisocyanatodicyclohexylmethane; and mixtures of such (cyclo)aliphatic polyisocyanates. Further suitable compounds are polyisocyanates modified with urethane, allophanate, isocyanurate, urea, biuret and/or uretidione groups based on (cyclo)aliphatic diisocyanates or mixtures upon mixtures thereof. Mixtures of unmodified diisocyanates with modified polyisocyanates may also be used as component a).

The component b) preferably used as a further reaction component comprises per se known compounds with isocyanate-reactive groups of a molecular weight range from 1800 to 12000, preferably of 3000 to 7000 or mixtures of such compounds, wherein, for the purposes of the isocyanate addition reaction, component b) has an (average) functionality of 2 to 6, preferably of 2.5 to 4 and particularly preferably of 2.6 to 3.0. Examples of compounds which are particularly suitable as component b) for the production of optionally microcellular moldings of a density range from 0.8 to 1.4 g/cm$^3$ from urea-modified polyurethanes, are polyether polyols or mixtures of polyether polyols, as are disclosed in German Auslegeschrift 2,622,951, column 6, line 65 to column 7, line 47, wherein preferred polyether polyols according to the invention are also those in which at least 50%, preferably at least 80% of the hydroxyl groups consist of primary hydroxyl groups. The polyesters, polythioethers, polyacetals, polycarbonates or polyesteramides disclosed the '951 reference are also, in principle, suitable as component b) according to the invention, but are less preferred than the polyether polyols.

Other compounds suitable as starting component b) are aminopolyethers or mixtures of aminopolyethers, i.e. polyethers with isocyanate-reactive groups, at least 50 equivalent-% of which, preferably at least 80 equivalent-% of which are composed of primary and/or secondary, aromatically or aliphatically, preferably aromatically attached amino groups and the remainder of primary and/or secondary aliphatically attached hydroxyl groups. Such aminopolyethers are, for example, the compounds described in European patent 081,701, column 4, line 26 to column 5, line 40.

Polyesters with amino groups of the above-stated molecular weight range are also suitable as starting component b), but are less preferred.

Mixtures of the isocyanate reactive compounds may also be used as component b).

Component c) comprises aromatic diamines of the type described in the European patent 081,701, column 5, line 58 to column 6, line 34.

The polyols or polyamines which may optionally be used as further reaction components d) are any desired non-aromatic compounds with at least two isocyanate-reactive groups of the molecular weight range from 60 to 1799, preferably of 62 to 500, in particular of 62 to 400. Polyhydric alcohols as are disclosed in European patent 081,701, column 9, lines 32 to 50 may, for example, be used. Further compounds which may be used include, for example, aliphatic polyamines having ether groups, for example polypropylene oxides having terminal primary amino groups. Polyols having cycloaliphatic rings, such as, for example, 1,4-dihydroxy-cyclohexane or 1,4-bis-hydroxymethyl-cyclohexane, and polyamines such as, for example, 1,4-cyclo-hexanediamine, isophoronediamine, bis-(4-aminocyclohexyl)-methane, bis-(3-methyl-4-aminocyclohexyl)methane, may also be used.

The auxiliary substances and additives e) optionally used in the production of the polyisocyanate polyaddition products include, for example, internal mold release agents, catalysts for the polyisocyanate polyaddition reaction, blowing agents such as water or pentane, surface-active additives, cell regulators, pigments, dyes, UV-stabilizers, plasticizers or fungistatic or bacteriostatic substances, as are, for example, described European patent 081,701, column 6, line 40 to column 9, line 31. Known fillers or reinforcing materials are also among the preferred, optionally used auxiliary substances and additives. Such materials include, for example, barium sulphate, diatomaceous earth, prepared chalk, mica or in particular glass fibers, LC fibers, glass flakes, glass spheres, aramid or carbon fibers, wherein these fillers and/or reinforcing materials may be used in quantities of up to 80 wt. %, preferably of up to 30 wt. %, relative to the total weight of the filled or reinforced polyisocyanate polyaddition products.

The process according to the invention is suitable not only for the production of foamed moldings, but also for the production of microcellular moldings as well as for the production of solid moldings made from optionally urea-modified polyurethanes of a flexible, semi-rigid or rigid consistency. The properties of the ultimately produced moldings may be adjusted in a manner known per se by varying the nature and quantity ratios of the starting materials used and by appropriately selecting the auxiliary substances used (for example blowing agent).

The polyisocyanate polyaddition products are preferably produced using the single stage process in such a manner that the polyisocyanate component a) is mixed with a mixture of components b) to e) using a suitable mixing apparatus, is introduced into the mold and reacts therein. It is also possible in principle to react the polyisocyanate polyaddition products using a modified single stage process, in accordance with which the polyisocyanate component a) is reacted with a proportion of component b) and optionally component d) to form NCO semi-prepolymers, which are then reacted with a mixture of the remaining components. It is also possible to produce elastomers using the conventional prepolymer process. In all cases, the NCO index (number of NCO groups divided by the number of NCO-reactive groups, multiplied by 100) is above 60, preferably 60 to 140, in preference 80 to 120, in particular 95 to 115. It is, however, also possible to operate in a manner known per se with NCO indices of substantially above 140, if per se known trimerization catalysts for organic polyisocyanates are simultaneously also used. In such a case, polyurethane plastics having isocyanurate groups are produced.

The reaction leading to the polyisocyanate polyaddition products, in particular to the stated polyurethanes, and shaping proceed in close metal molds. These metal molds are in particular made of steel, but metal molding tools made of aluminum, zinc or any desired metal alloys may be also be used.

The essential feature of the invention consists in the internal walls of the metal mold being coated at least partially, preferably completely, with a release agent according to the invention prior to mold filling. To this end, the release agents according to the invention, in particular the preferred release agents according to the invention having isocyanate groups, are preferably used in the form of a release agent preparation according to the invention, i.e. in the form of a 0.1 to 100, preferably 1.0 to 50 wt. % solution in an appropriate solvent which is inert towards isocyanate groups. The term "100 wt. % solution" is intended to mean that it is also possible to use the mold release agents according to the invention provided that they are fluid substances at room temperature, without solvents. Suitable solvents include, for example, esters such as ethyl acetate, isobutyl acetate, methoxypropyl acetate; ketones such as acetone, methyl ethyl ketone, and methyl isobutyl ketone; hydrocarbons such as cyclohexane, n-hexane, special petroleum spirits, and toluene; or mixtures of such solvents.

The release agent is applied to the internal surface of the mold using conventional techniques, such as brushing or spraying, preferably using per se known spray guns, in particular using airless guns. If release agents according to the invention are used which contain no isocyanate groups and no polar groups A) which are reactive with water, such release agents may also be used in the form of aqueous preparations, for example in the form of aqueous emulsions. The quantity of mold release agent which must be applied for an enduring release action (many reaction cycles without recoating the internal walls of the mold) may be determined in a preliminary test. The metal molding tools are generally carefully cleaned before the internal walls are coated with the release agent according to the invention. Once the applied release agent preparation has dried, the molding tools are ready to use. In comparison with similar shaping tools treated with known mold release agents, molding tools pretreated according to the invention are in particular distinguished by a more enduring release action (increase in the number of reaction cycles without renewed pretreatment with release agent).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of moldings from plastic forming materials in metal molds comprising coating at least a portion of the internal walls of the mold with an external mold release agent, introducing the plastic forming material into the mold, closing the mold, and removing the product from the mold, the improvement wherein said external mold release agent comprises molecules of one or more organic compounds, the molecules containing on a statistical average A) from 0.5 to 1.2 polar groups selected from the group consisting of —CN, —NC, —NCO, —CNO, —OCN, —SCN and —NCS and B) at least one non-polar hydrocarbon chain with at least 12 carbon atoms, which chain may be at least partially fluorinated, and which may be interrupted by heteroatoms and/or carbonyl groups.

2. The process of claim 1, wherein said release agent contains an isocyanate group as the polar group A) and said non-polar hydrocarbon chain is selected from the group consisting of alkyl, alkaryl, aralkyl and aryl groups.

3. The process of claim 1, wherein said release agent is a reaction product of an organic polyisocyanate having a molecular weight of from 168 to 300 with substoichiometric quantities of fatty alcohols and/or fatty amines which are monofunctional for the purposes of the isocyanate addition reaction.

4. The process of claim 1, wherein said release agent contains a statistical average of 0.5 to 1.2 isocyanate groups per molecule.

5. The process of claim 1, wherein said plastic forming material is a polyurethane reaction mixture.

* * * * *